US012266254B2

(12) United States Patent
Brew et al.

(10) Patent No.: US 12,266,254 B2
(45) Date of Patent: Apr. 1, 2025

(54) CORROBORATING DEVICE-DETECTED ANOMALOUS BEHAVIOR

(71) Applicant: INTERNATIONAL BUSINESS MACHINES CORPORATION, Armonk, NY (US)

(72) Inventors: Kevin W. Brew, Niskayuna, NY (US); Michael S. Gordon, Chappaqua, NY (US); Mattias Fitzpatrick, Mount Kisco, NY (US); Brian Paul Gaucher, Brookfield, NY (US)

(73) Assignee: International Business Machines Corporation, Armonk, NY (US)

( * ) Notice: Subject to any disclaimer, the term of this patent is extended or adjusted under 35 U.S.C. 154(b) by 76 days.

(21) Appl. No.: 17/932,494

(22) Filed: Sep. 15, 2022

(65) Prior Publication Data

US 2024/0096191 A1 Mar. 21, 2024

(51) Int. Cl.
*G08B 21/10* (2006.01)
*G16Y 20/10* (2020.01)

(52) U.S. Cl.
CPC .............. *G08B 21/10* (2013.01); *G16Y 20/10* (2020.01)

(58) Field of Classification Search
None
See application file for complete search history.

(56) References Cited

U.S. PATENT DOCUMENTS 8,350,694 B1 * 1/2013 Trundle ................ G08B 25/10 340/539.11
9,196,148 B1 * 11/2015 Hutz .................... G08B 25/005
10,104,098 B2 * 10/2018 Baxley ..................... H04K 3/42
10,182,066 B2 1/2019 Flacher
10,258,295 B2 * 4/2019 Fountaine ............. A61B 5/1117
11,032,302 B2 6/2021 Garcia
11,102,236 B2 * 8/2021 Shurtleff ............... H04L 43/065
11,200,799 B2 * 12/2021 Vrabete .................. G08G 1/017
(Continued)

FOREIGN PATENT DOCUMENTS

WO 2019178149 A1 9/2019

OTHER PUBLICATIONS

"Furbo", Downloaded from the Internet on Jun. 21, 2022, 9 pgs., <https://shopus.furbo.com/?gclid=Cj0KCQiAjJOQBhCkARIsAEKMtO34cd2On6t-MDTRNK1GiN3a1y0v3XPEmRfKz5loOXLc81GjHFVjPxMaAso2EALw_wcB>.
Chen, et al., "Intrusion Detection in Wireless Mesh Networks", Security in Wireless Mesh Networks, 2009, 32 pgs.
(Continued)

*Primary Examiner* — Carlos Garcia
(74) *Attorney, Agent, or Firm* — Eric W. Chesley

(57) ABSTRACT

Described are techniques for corroborating anomalous behavior. The techniques include training devices included in an Internet of Things (IoT) mesh network to independently identify occurrences of anomalous behavior in a proximate physical environment. The techniques further include receiving event data from at least a portion of the devices in the IoT mesh network corresponding to a time window, where the event data reports occurrences of at least one type of anomalous behavior. The techniques further include corroborating the at least one type of anomalous behavior to determine that the occurrences of the at least one type of anomalous behavior indicate an anomalous event that meets a reporting threshold for providing notice of the anomalous event. The techniques further include generating a notification regarding the anomalous event.

20 Claims, 7 Drawing Sheets

(56) References Cited

U.S. PATENT DOCUMENTS

| | | | | |
|---|---|---|---|---|
| 11,258,874 | B2 | 2/2022 | Walsh | |
| 11,374,819 | B2 * | 6/2022 | Lou | G06F 3/0482 |
| 11,556,740 | B2 * | 1/2023 | DeLuca | G16Y 20/10 |
| 11,683,328 | B2 * | 6/2023 | Ektare | H04L 63/20 726/22 |
| 11,694,149 | B2 * | 7/2023 | Bartlett | G16Y 20/10 705/332 |
| 11,855,865 | B2 * | 12/2023 | Sharma | H04L 67/12 |
| 2003/0080867 | A1 * | 5/2003 | Rusinol Simon | G08B 29/08 340/541 |
| 2005/0099271 | A1 * | 5/2005 | Sasaki | B60R 25/1004 340/426.1 |
| 2009/0066488 | A1 * | 3/2009 | Qiahe | B60R 25/102 340/541 |
| 2015/0333992 | A1 * | 11/2015 | Vasseur | H04L 12/4633 370/252 |
| 2018/0325470 | A1 * | 11/2018 | Fountaine | G08B 21/0469 |
| 2019/0182278 | A1 * | 6/2019 | Das | H04L 63/1425 |
| 2020/0082340 | A1 * | 3/2020 | Wing | G06F 1/30 |
| 2020/0111350 | A1 * | 4/2020 | Julian | G08G 1/04 |
| 2020/0162503 | A1 * | 5/2020 | Shurtleff | G06F 9/451 |
| 2020/0211364 | A1 * | 7/2020 | Kasiviswanathan | G08B 13/19663 |
| 2020/0242471 | A1 * | 7/2020 | Busch | G06N 3/08 |
| 2020/0320845 | A1 * | 10/2020 | Livny | H04L 63/1408 |
| 2020/0358810 | A1 * | 11/2020 | Fellows | H04L 63/20 |
| 2021/0077036 | A1 * | 3/2021 | Fountaine | G08B 21/0407 |
| 2021/0174140 | A1 * | 6/2021 | DeLuca | G16Y 20/10 |
| 2021/0209144 | A1 * | 7/2021 | Trim | G06F 16/367 |
| 2021/0243084 | A1 * | 8/2021 | Lou | G06F 3/0482 |
| 2022/0103591 | A1 * | 3/2022 | Maturana | H04L 63/1425 |
| 2022/0191113 | A1 * | 6/2022 | Oh | H04L 43/062 |
| 2022/0303291 | A1 * | 9/2022 | Baldini Das Neves | G06N 5/022 |
| 2022/0407769 | A1 * | 12/2022 | Thornton | H04L 41/0622 |
| 2023/0055677 | A1 * | 2/2023 | Dhelaria | G06F 16/254 |
| 2023/0290121 | A1 * | 9/2023 | Park | G06T 11/60 |
| 2023/0326325 | A1 * | 10/2023 | Bedford | G08B 13/22 340/539.11 |
| 2023/0333958 | A1 * | 10/2023 | Zhang | G06F 11/3409 |
| 2023/0419083 | A1 * | 12/2023 | Niu | G08B 13/19602 |

OTHER PUBLICATIONS

Choi, et al., "Human Behavioral Pattern Analysis-Based Anomaly Detection System in Residential Space", The Journal of Supercomputing, Feb. 4, 2021, 18 pgs., <https://doi.org/10.1007/s11227-021-03641-7>.

Disclosed Anonymously, "A Method to Filter Low-Value Data in IoT Systems Using AI", An IP.com Prior Art Database Technical Disclosure, IP.com No. IPCOM000262771D, Jun. 29, 2020, 4 pgs.

Disclosed Anonymously, "Anomalies and Threats Detect in IoT (Internet of Things) System Based on User Behavior", An IP.com Prior Art Database Technical Disclosure, IP.com No. IPCOM000263688D, Sep. 27, 2020, 3 pgs.

Gibeault, S., "Can Dogs Predict Earthquakes?", American Kennel Club, Feb. 21, 2018, 6 pgs., <https://www.akc.org/expert-advice/lifestyle/can-dogs-predict-earthquakes/>.

Hasan, et al., "Anomaly detection using streaming analytics & AI", Data Analytics, Blog, Google Cloud, Aug. 10, 2020, 9 pgs., <https://cloud.google.com/blog/products/data-analytics/anomaly-detection-using-streaming-analytics-and-ai>.

Khan, M., "Anomaly Detection with Isolation Forest and Kernel Density Estimation", Machine Learning Algorithms, Jan. 1, 2020, 21 pgs., <https://machinelearningmastery.com/anomaly-detection-with-isolation-forest-and-kernel-density-estimation/>.

Kukoba, A., "Connecting IoT Devices with Mesh Networking: Pros, Cons, and Existing Solutions", Dev Blog, Apriorit, Apr. 23, 2020, 25 pgs., <https://www.apriorit.com/dev-blog/673-mobile-mesh-networking-for-iot>.

Latif, et al., "Intrusion Detection Framework for the Internet of Things using a Dense Random Neural Network", IEEE Transactions on Industrial Informatics, Heriot Watt University, Digital Object Identifier (DOI): 10.1109/TII.2021.3130248, Sep. 2022, 11 pgs.

Lawal, et al., "Security Analysis of Network Anomalies Mitigation Schemes in IoT Networks", IEEE Access, Feb. 2020, 20 pgs., Digital Object Identifier 10.1109/ACCESS.2020.2976624.

Robinson, M., "2011 Dog reacts to Earthquake in the Washington DC Metro Area", YouTube, Aug. 23, 2011, 3pgs., <https://www.youtube.com/watch?v=hVoLUuUy-nY>.

Tan, et al., "Privacy Preserving Anomaly Detection for Internet of Things Data", An IP.com Prior Art Database Technical Disclosure, IP.com No. IPCOM000252511D, Jan. 19, 2018, Copyright 2018 Cisco Systems, Inc., 6 pgs.

* cited by examiner

CORROBORATING DEVICE-DETECTED ANOMALOUS BEHAVIOR

BACKGROUND

The present disclosure relates to Internet of Things (IoT) networks, and, more specifically, to corroborating anomalous behavior detected by IoT devices trained to detect the anomalous behavior in a respective proximate physical environment.

Generally, an IoT network integrates a distributed network of "things" into an information technology infrastructure. A "thing" in the IoT network can comprise a device (IoT device) having one or more sensors that generate data and transmit the data to other nodes in the IoT network. The devices can be distributed over a relatively broad area. For example, devices can be distributed throughout a residential, commercial, and/or regional area to monitor various activities and/or environmental factors within the areas. In some scenarios, the devices can be connected to form an IoT mesh network, where the devices are connected directly in a non-hierarchical way to route data across the network. The devices in the IoT mesh network communicate according to a predefined protocol that allows each device to participate in the data transmission on the network.

SUMMARY

Aspects of the present disclosure are directed toward a computer-implemented method comprising training devices included in an Internet of Things (IoT) mesh network to independently identify occurrences of anomalous behavior in a proximate physical environment. The computer-implemented method further comprising receiving event data from at least a portion of the devices in the IoT mesh network corresponding to a time window, where the event data reports occurrences of at least one type of anomalous behavior. The computer-implemented method further comprising corroborating the at least one type of anomalous behavior to determine that the occurrences of the at least one type of anomalous behavior indicate an anomalous event that meets a reporting threshold for providing notice of the anomalous event. The computer-implemented method further comprising generating a notification regarding the anomalous event.

Additional aspects of the present disclosure are directed to systems and computer program products configured to perform the methods described above. The present summary is not intended to illustrate each aspect of, every implementation of, and/or every embodiment of the present disclosure.

BRIEF DESCRIPTION OF THE DRAWINGS

The drawings included in the present application are incorporated into and form part of the specification. They illustrate embodiments of the present disclosure and, along with the description, serve to explain the principles of the disclosure. The drawings are only illustrative of certain embodiments and do not limit the disclosure.

Figure 1:
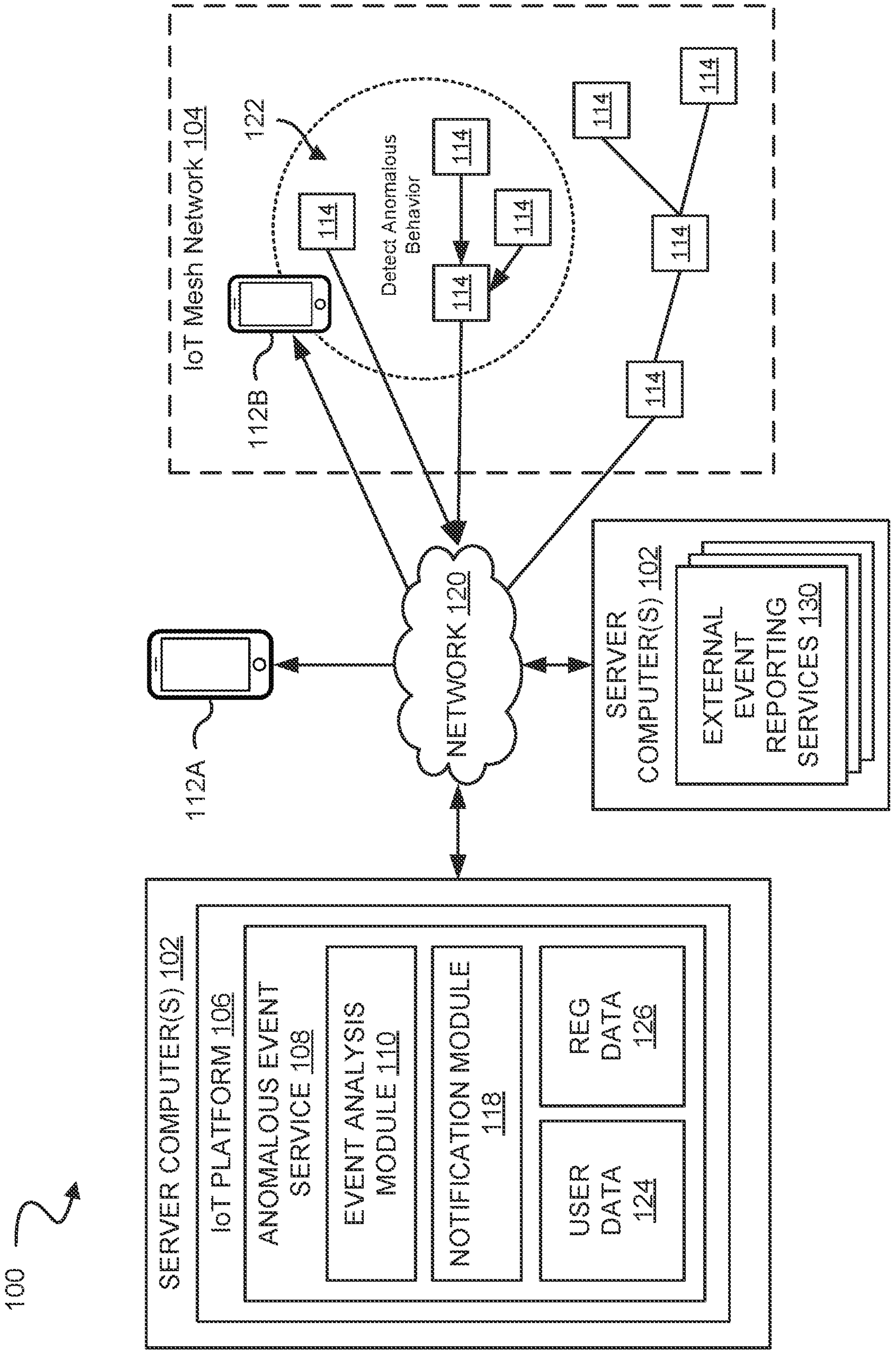
FIG. 1 is a block diagram illustrating an example computational environment implementing an anomalous event service, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward corroborating anomalous behavior detected by IoT devices trained to identify instances of anomalous behavior in a respective proximate physical environment. Corroborated anomalous behavior can indicate an anomalous event that may be occurring, or may soon occur, in a geographical region where the anomalous behavior was detected. While not limited to such applications, embodiments of the present disclosure may be better understood in light of the aforementioned context.

Anomalous events, including natural disasters, social unrest, anomalous activity, accidents, fires, and the like often result in harm to persons and property. Receiving notice of an anomalous event (e.g., prior to, or concurrently) may provide impacted individuals an opportunity to take actions that reduce the harm to persons and/or property. For example, some types of anomalous events, such as natural disasters, can be preceded by certain types of anomalous behavior (e.g., increased animal anxiety and/or activity). Other types of anomalous events, such as break-ins, riots, fires, and the like can provoke certain kinds of anomalous behavior (e.g., barking dogs, loud human vocalizations, emergency sirens, etc.). If in the event that multiple instances of anomalous behavior associated with an anomalous event are detected, harm to persons and/or property could be avoided or reduced by notifying persons potentially impacted by the anomalous event.

Advantageously, aspects of the present disclosure address these challenges by corroborating anomalous behavior detected by devices in a mesh IoT network to determine that an anomalous event may be occurring, or may soon occur, and providing a notification regarding the anomalous event to devices subscribed to receive the notification. More specifically, aspects of the present disclosure can train devices included in a mesh network to independently identify occurrences of certain anomalous behaviors in a physical environment proximate to the devices. Aspects of the present disclosure can receive event data from at least a portion of the trained devices reporting the anomalous behavior and corroborate the anomalous behavior as being associated with an anomalous event occurring in a geographical region of the reporting devices. Aspects of the present disclosure can then generate a notification regarding the anomalous event, and the notification can be sent to user-devices (e.g., mobile devices) subscribed to receive the notification.

Figure 7:
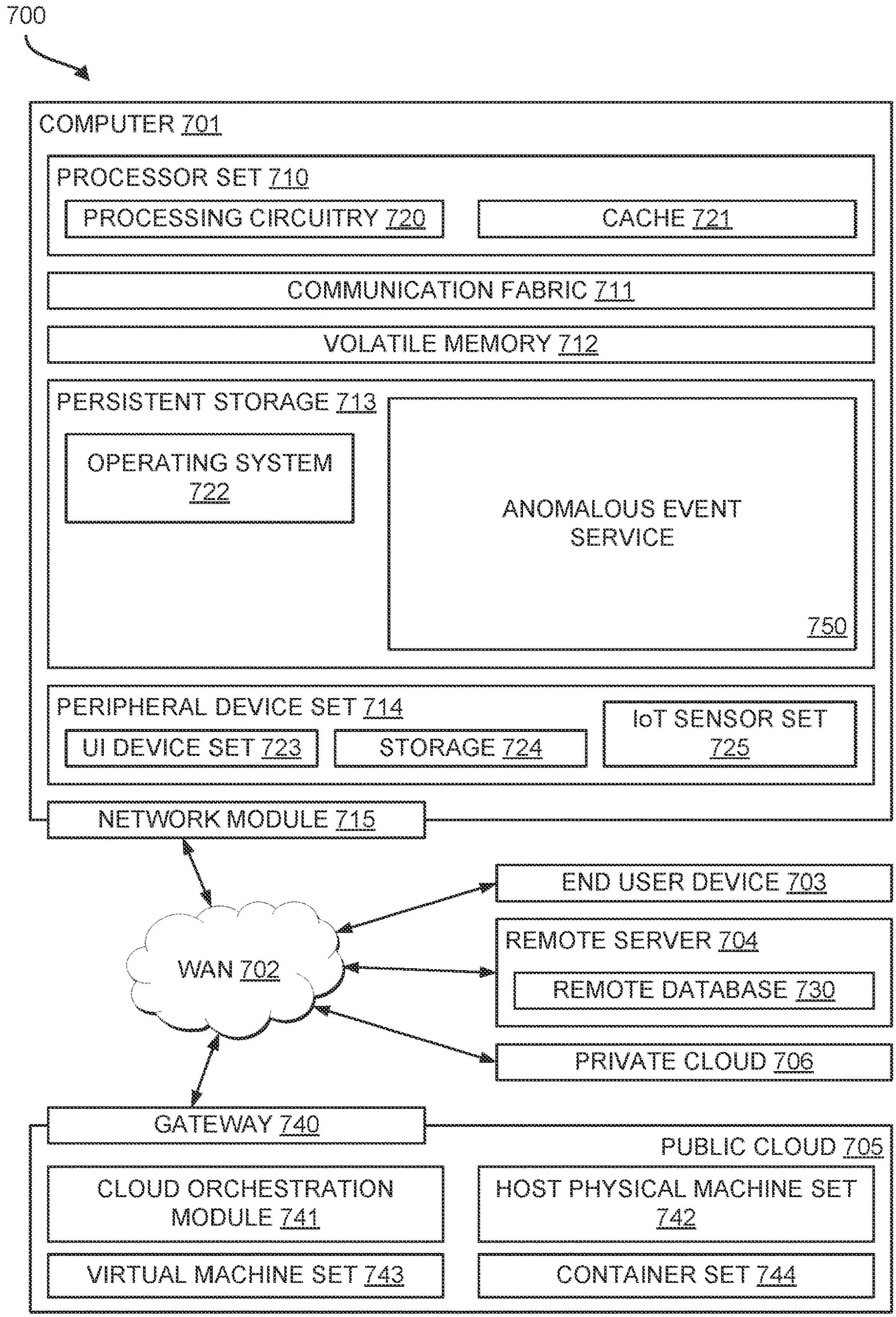
FIG. 7 is a block diagram that illustrates an example computing environment in which aspects of the present disclosure can be implemented, in accordance with some embodiments of the present disclosure.

Referring now to the figures, FIG. 1 illustrates a block diagram of an example computational environment 100 implementing an anomalous event service 108, in accordance with some embodiments of the present disclosure. As shown, the computational environment 100 can include one or more server computers 102 that host an IoT platform 106 which is in network connection with devices 114 (e.g., IoT devices) included in an IoT mesh network 104, as well as user-devices 112A and 112B (e.g., mobile devices). The IoT platform 106 can comprise a suite of components that enable: deployment of applications that monitor, manage, and control the devices 114; remote data collection from the devices 114; and independent and secure connectivity between the devices 114. The suite of components may include, but are not limited to, a hardware architecture, an operating system, a runtime library, one or more edge devices, and/or containerized workloads. The IoT platform 106 manages connections between the devices 114 and the various other applications, services, and/or systems. In some embodiments, the IoT platform 106 can be hosted in a cloud computing environment (e.g., public or private cloud), which is described in greater detail in association with FIG. 7.

The IoT mesh network 104 can include gateways, nodes, and endpoints. Although FIG. 1 illustrates a single IoT mesh network 104 in network communication with the IoT platform 106, it will be understood that the IoT platform 106 can be in network communication with multiple IoT mesh networks 104. Gateways are devices (e.g., a device 114) that connect the IoT mesh network 104 to a wide area network (WAN), including the Internet. The gateways allow nodes to connect and interact with systems outside the IoT mesh network 104 itself. Nodes are network devices (e.g., a device 114) that pass both their own data and data received from other nodes across the IoT mesh network 104. The nodes enable a device 114 to receive messages regardless of how far the device 114 is from a gateway. An endpoint is a device (e.g., a device 114) that passes its own data to other nodes, but does not forward data from other nodes. It should be appreciated that the gateways, nodes, and endpoints of an IoT mesh network 104 can be distributed throughout a building, as well as across a region, such as a neighborhood, campus, city, and the like. The infrastructures of an IoT mesh network 104 can use a number of protocols to transmit data, including ZIGBEE, THREAD, BLUETOOTH mesh, Z-WAVE, and the like.

A device 114 included in an IoT mesh network 104 includes sensors (e.g., camera, microphone, accelerometers, thermometers, and other sensors) configured to generate data (e.g., images, video, sound, etc.) from a proximate physical environment (e.g., a room in a house or office containing persons and/or pets, a public space, etc.). At least a portion of the devices 114 in the IoT mesh network 104 are independently trained to analyze the data generated by the device's sensor(s) and identify occurrences of anomalous behavior. The anomalous behavior can include human behavior, animal behavior, behaviors associated with natural phenomena, as well as other types of anomalous behaviors. The devices 114 are independently trained to a particular environment (e.g., household, office, public space, etc.), such that each device 114 is trained to detect behaviors associated with a unique environment (e.g., specific persons, pets, public or private spaces, etc.). Accordingly, a device 114 is trained to detect behavior considered to be anomalous for a particular environment, which may not be considered anomalous for a different environment.

An anomalous event is one that is outside a normal data pattern (e.g., outlier data). Generally, anomaly detection comprises observing an environment (e.g., human environment, pet environment, etc.) in various fields, and deriving patterns and comparing the patterns to a current state. Data that deviates above a threshold from normal data patterns in the environment comprises an anomaly that can be classified as anomalous behavior. Behavior data for a human, animal, and/or natural phenomena can be derived from event data generated by the sensors of a device 114. The devices 114 monitor event data and perform anomaly detection by comparing a current behavior status in real time with various behavior patterns.

In some embodiments, the devices 114 host a behavior classifier (not shown) to classify a current behavior status as normal or abnormal. The behavior classifier, in some embodiments, can be trained using reinforcement learning. The reinforcement learning can comprise providing predicted behavior output by the behavior classifier to a user, and the user indicates the correctness of the predicted behavior. As a non-limiting example, a device 114 can provide an image or video of a pet to a user (e.g., via a device display or a user-device 112B) along with a behavior classification (e.g., barking, howling, running, etc.) and ask the user whether the behavior classification is correct and whether the behavior is normal or abnormal. As an example, it might be perfectly normal for a dog to bark when a stranger is at the front door of a home, but anomalous if the barking continues for some period of time after the stranger is no longer present.

In some embodiments, the behavior classifier can be trained using an object detection algorithm that uses a deep learning technique, such as a mask regional convolutional neural network (CNN) model, you only look once (YOLO) model, single-shot detector (SSD) model, and a faster regional CNN (faster R-CNN). The deep learning technique determines a current target behavior for each input image frame, then stores the current behavior in a database. An anomaly calculator uses a sequence alignment algorithm to compare behavior data in the database with subsequence patterns derived using a pattern generator to determine a degree of abnormality of a current behavioral state. The sequence alignment is largely divided into global alignment, comparing two sequences, and local alignment, comparing which parts of two sequences have high homology. The anomaly calculator calculates the degree of abnormality by comparing the subsequence pattern generated by the pattern generator with a dataset delivered from the behavior classifier. Unlike the pattern generator, which uses data collected over a long period, the anomaly calculator collects data for a short period (e.g., 10 seconds) to calculate the degree of abnormality over a short period. The devices 114, in response to identifying anomalous behavior, send event data to an anomalous event notification service 108 hosted by the IoT platform 106.

The anomalous event service 108 receives event data sent from devices 114 and determines whether the anomalous behavior identified by the devices 114 is associated with an anomalous event that warrants sending a notification regarding the anomalous event to subscribed user-devices 112A and/or 112B. An anomalous event can comprise an accidental, inadvertent, involuntary, unanticipated, unexpected, uncontrolled, unintentional, or malicious event that potentially has an adverse effect upon persons and/or property. Event data generated by the devices 114 (e.g., at least two or more devices) can include: behavior identification information (e.g., behavior type, such as barking, howling, running, yelling, screaming, a siren, a fire, a strong vibration, a loud noise above a decibel threshold, a temperature above a heat threshold, smoke, chemicals, gas, as well as any other identifying features of abnormal behavior that can be related to an abnormal event); a timestamp; location data (global positioning system (GPS) coordinates, cell tower location, zip code, street address, etc.), device identification information (e.g., internet protocol (IP) address, media access control (MAC) address, international mobile equipment identify (MAC) number, etc.); and any other appropriate information that can be provided by a device 114.

As illustrated, the anomalous event service 108 includes an event analysis module 110 and a notification module 118. The event analysis module 110 corroborates instances of anomalous behavior identified by reporting devices 122 to determine whether the instances of anomalous behavior comprise an anomalous event. In some embodiments, analysis module 110 receives event data sent by reporting devices 122 and caches the event data in computer memory, which can be cleared periodically as part of a memory management process. The analysis module 110 identifies instances of anomalous behavior (which can be instances of any type of anomalous behavior) detected within an IoT mesh network 104 (e.g., a household, neighborhood, zip code, city, or other defined region) that occurred during a time window (e.g., 10-30 seconds or 1-5 minutes) and determines whether an intensity (e.g., cadence) and frequency (e.g., number of device and/or reports) of the anomalous behavior reported by the reporting devices 122 meets a reporting threshold.

Figure 2:
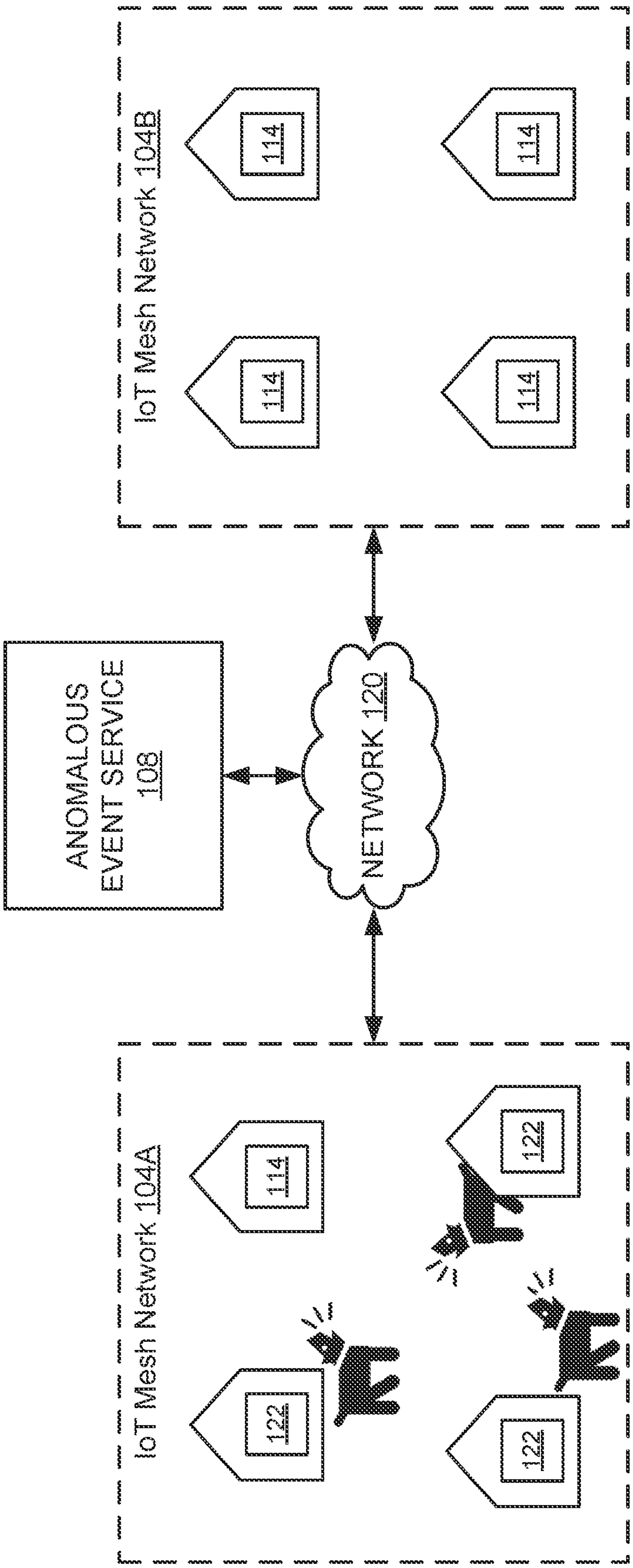
FIG. 2 is a diagram illustrating an example scenario of corroborating anomalous behavior identified by devices in an IoT mesh network, in accordance with some embodiments of the present disclosure.

A reporting threshold can be set by a user and/or a system administrator. Also, a reporting threshold can be defined for each type of anomalous event (e.g., natural disaster, anomalous activity, accident, etc.), specific IoT mesh network 104, and/or anomalous event service user. As a non-limiting example, where a reporting threshold for an IoT mesh network 104 requires that at least three devices 114 report anomalous behavior within a one-minute time window, reports of anomalous behavior received from three or more reporting devices 122 within the one-minute time window satisfies the reporting threshold. As an illustration, referring generally to FIG. 1 and FIG. 2, the anomalous event service 108 can be in network communication with a plurality of IoT mesh networks 104A and 104B, and reporting devices 122 in an IoT mesh network 104A can send event data to the anomalous event service 108 when the reporting devices 122 identify anomalous behavior, like uncharacteristic barking. The event analysis module 110 analyzes the event data to determine a location of the reporting devices 122 (e.g., an IoT mesh network 104A and geographic location) and determines whether the reports of anomalous behaviors meet the reporting threshold for a type of anomalous event, IoT mesh network 104, and/or anomalous event service user.

In some embodiments, corroboration of anomalous behavior can comprise determining that separate instances of anomalous behavior are features of a particular type of anomalous event (e.g., natural disaster, anomalous activity, accident, etc.). To explain further, instances of anomalous behavior detected by the devices 114 can be various types of behavior associated with a specific person, pet, or group thereof. For example, anomalous behavior for a specific dog can include running, barking, howling, cowering, etc. during times that are uncharacteristic for the dog; and anomalous behavior for a particular person can include uncharacteristic screaming or shouting, running, hiding, etc. Types of anomalous behavior can also be associated with a particular environment, such as a household, room, office, public or private space, and can include uncharacteristic behavior, such as erratic actions of a household, fire, strong winds, hail, lightning and thunder, etc.

Some types of anomalous behavior can be a feature (e.g., a secondary or consequential feature) of a particular anomalous event. For example, the uncharacteristic barking, running, or whimpering of a dog can be a consequential feature of a natural disaster, a break-in, a medical emergency, or another type of anomalous event that provokes the anomalous behavior. Accordingly, instances of anomalous behavior that are consequential features of an anomalous event, when detected during a time period that corresponds to the anomalous event (e.g., a typical length or duration of the anomalous event), can indicate the occurrence, or the imminent occurrence, of the anomalous event. As an example, because it has been documented that animals may be able to detect an imminent earthquake prior to humans detecting the earthquake, the anomalous behavior of pets located throughout a region detected substantially at the same time (e.g., 10-30 second window) by reporting devices 122 may indicate an imminent earthquake. As another example, because anomalous activity can provoke shouting, alarm sirens, emergency response sirens, etc., instances of anomalous behavior detected close in time (e.g., during a 1-5 minute time period) by reporting devices 122 located within a neighborhood or public space may indicate an incident that requires the response of a local authority.

Therefore, with the above explanation in mind, the analysis module 110 analyzes cached event data received from reporting devices 122 to determine whether instances of anomalous behavior reported by the reporting devices 122 may be associated with a particular anomalous event (e.g., earthquake, break-in, housefire, etc.), or category of anomalous event (e.g., natural disaster, accident, etc.). More specifically, in some embodiments, the analysis module 110 identifies instances of anomalous behavior detected within an IoT mesh network 104 (or multiple IoT mesh networks); determines that the instances of anomalous behavior are features of a particular type of anomalous event or category of anomalous event; determines that the instances of anomalous behavior occurred during a time window that corresponds to the type of anomalous event; and determines that an intensity and frequency of the anomalous behavior reported by the reporting devices 122 meets a reporting threshold. In some embodiments, the analysis module 110 can use external event data obtained from external event reporting services 130 to link anomalous behavior to a particular type of anomalous event or category of anomalous event. As an example, the analysis module 110 can use weather data (e.g., tornado warning) obtained from a weather monitoring service to determine that anomalous pet behavior detected by reporting devices 114 is a feature of an existing or impending tornado event. In this embodiment, a reporting threshold can be defined for each type of anomalous event. As a non-limiting example, a reporting threshold for a fire in a home may require that only two devices 114 report anomalous behavior associated with the fire (e.g., smoke detector and barking dog), whereas a reporting threshold for a natural disaster (e.g., a tornado) may require that five or more devices 114 report anomalous behavior associated with a natural disaster (e.g., abnormal pet behavior and high winds).

In some embodiments, as part of determining that anomalous behavior reported by reporting devices 122 meets a reporting threshold, the analysis module 110 determines whether the anomalous behavior correlates to an expected, ordinary, or non-threating external event, such as calendar events (e.g., Independence Day events, professional sports events, political events, and the like), moderate weather events (e.g., mild thunderstorms), traffic events (e.g., scheduled airline takeoffs and landings, rush hour traffic, etc.), and other events that may provoke abnormal behavior in animals, people, or in an environment, but generally does not warrant an external notification regarding the event. In some embodiments, users of the anomalous event service 108 can indicate which events warrant a notification and/or which events to ignore. User preferences can be stored in user data 124, and the anomalous event service 108 can reference the user preferences when determining whether to provide a user with an anomalous event notification.

In some embodiments, the analysis module 110 can determine a more precise location where an anomalous event has been detected within an IoT mesh network 104 using physical location information contained in event data received from reporting devices 122 and provide the location to registered user-devices 112A and 112B. For example, in cases where an IoT mesh network 104 covers a fairly large area (e.g., a neighborhood), the analysis module 110 can determine a more precise location (e.g., a house or adjacent houses) where multiple instances of detected anomalous behavior indicates an anomalous event. The location can be determined using location information obtained from event data generated by reporting devices 122. The location of the anomalous event can be provided in a notification to one or more user devices 112A and/or 112B, as described below.

Figure 3:
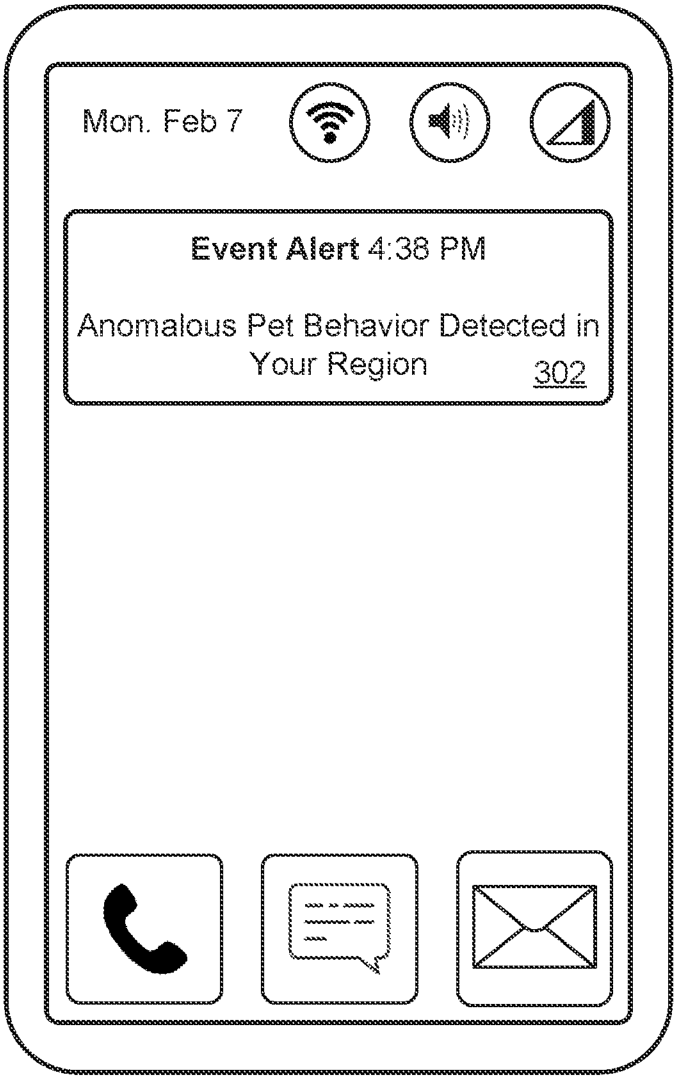
FIGS. 3, 4, and 5 illustrate example notifications of anomalous events, in accordance with some embodiments of the present disclosure.
Figure 4:
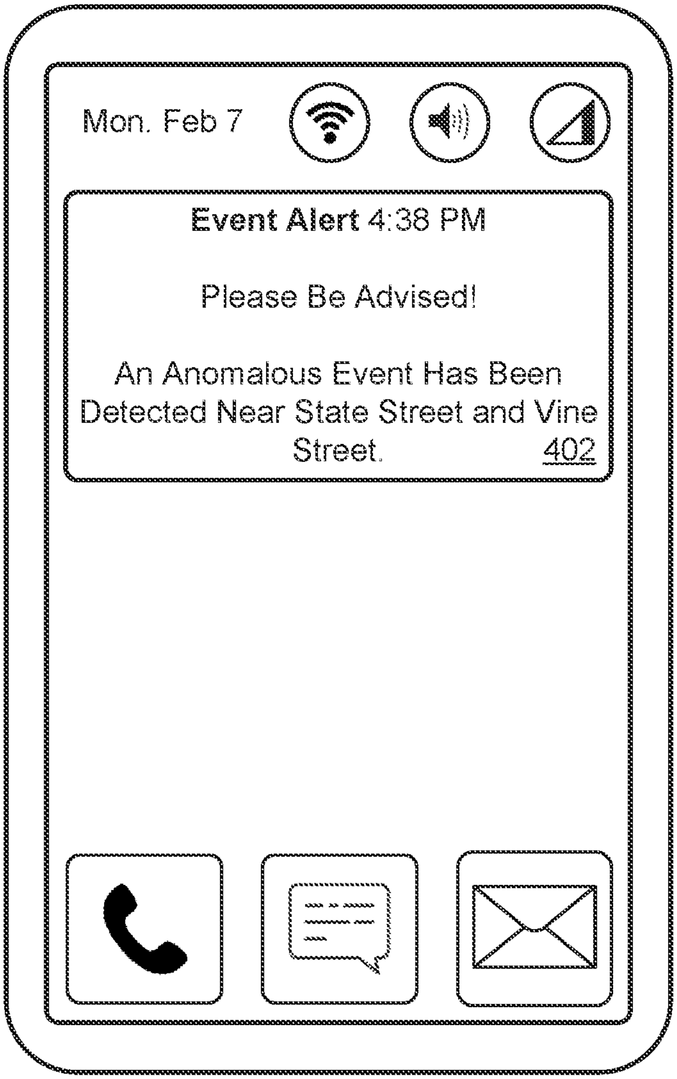
Figure 5:
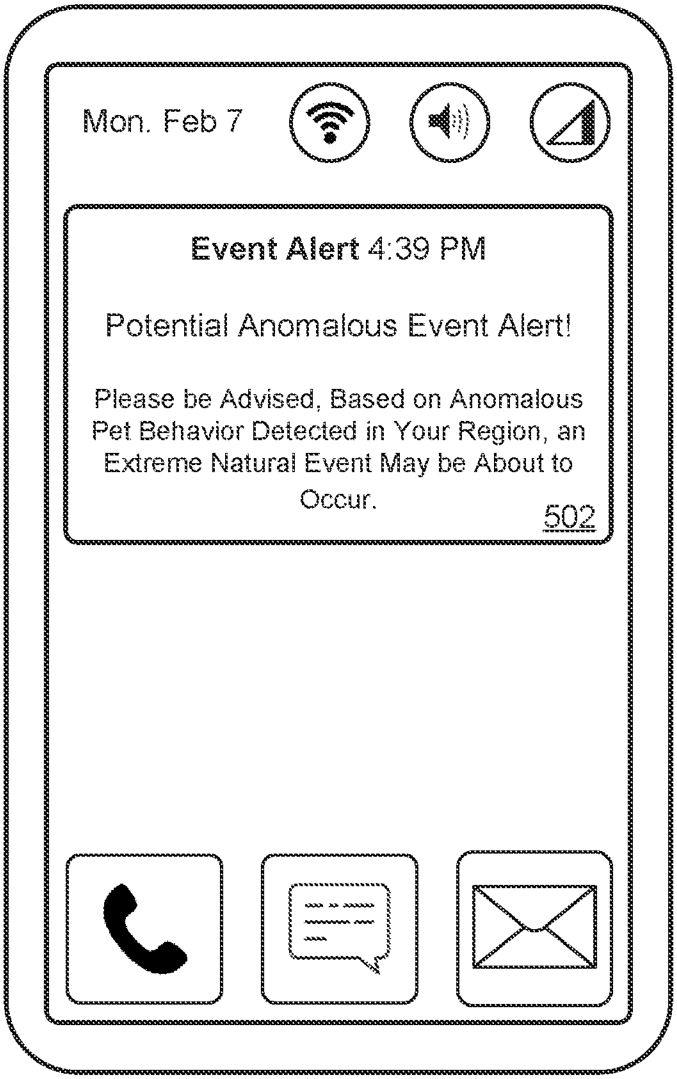

The notification module 118 generates a notification for an anomalous event detected in an IoT mesh network 104 when a reporting threshold for the anomalous event is met, and the notification module 118 sends the notification to the users in the IoT mesh network 104, and in some embodiments, to users who are unaffiliated with the IoT mesh network 104 (e.g., government authorities). Illustratively, a notification can include: general information about an anomalous event (e.g., a general message 302 indicating abnormal pet behavior in a user's region, as shown in FIG. 3); more specific information about an anomalous event (e.g., a message 402 containing location information, as shown in FIG. 4); or in some cases, provide information about a potential anomalous event (e.g., a message 502 indicating that based on detected anomalous pet behavior, an extreme natural event may be about to occur, such as an earthquake, as shown in FIG. 5). As will be appreciated, information provided in a notification can include any information that may be relevant to an anomalous event detected in an IoT mesh network 104.

In some embodiments, the notification module 118 sends a notification to each user in an IoT mesh network 104 (e.g., to a user-device 112B, such as a mobile device, and/or to a device 114 having a display and/or a speaker). For example, the notification module 118 can query a database containing user data 124 to obtain a listing of users and devices (e.g., user-devices 112B and/or devices 114) associated with an IoT mesh network 104 and send a notification to the devices. A notification can be sent to a device using a push protocol, short message service (SMS), multimedia messaging service (MMS), email, or any other appropriate messaging technique.

In some embodiments, instead of sending a notification to every user in an IoT mesh network 104, the notification module 118 can send a notification to only those users (e.g., user-devices 112B and/or devices 114) that are subscribed to receive the notification, or to those users determined to be potentially impacted by an anomalous event reported in the notification. For example, the notification module 118 can query user data 124 to identify users who are subscribed to receive notifications, or identify users associated with reporting devices 122 (via reporting device data), and send a notification to the user's devices (e.g., user-devices 112B and/or devices 114).

Also, in some embodiments, the notification module 118 can send notifications to individuals who are not part of an IoT mesh network 104 (e.g., persons who are unaffiliated with devices 114 in the IoT mesh network 104, such as government agencies and emergency response personnel). For example, individuals who have an interest in monitoring occurrences of abnormal events in a region of an IoT mesh network (e.g., government officials) can register their user-device 112A with the anomalous event service 108. In response to an anomalous event being detected in the region that warrants a notification, the notification module 118 can query a database containing registration (REG) data 126 to obtain registered device information for the individual and send the notification to the individual's user-device 112A.

As will be appreciated, in some embodiments, the modules described above can be implemented as computing services hosted in a computing service environment. For example, a module can be considered a service with one or more processes executing on a server or other computer hardware. Such services can provide a service application that receives requests and provides output to other services or consumer devices. An API can be provided for each module to enable a first module to send requests to and receive output from a second module. Such APIs can also allow third parties to interface with the module and make requests and receive output from the modules.

FIG. 1 illustrates that a network 120 is provided to enable communication between the components of the computational environment 100. The network 120 can include any useful computing network, including an intranet, the Internet, a local area network, a wide area network, a wireless data network, or any other such network or combination thereof. Components utilized for the network 120 can depend at least in part upon the type of network and/or environment selected. Communication over the network 120 can be enabled by wired or wireless connections and combinations thereof. While FIG. 1 illustrates an example of a computational environment that can implement the techniques above, many other similar or different environments are possible. The example environments discussed and illustrated above are merely representative and not limiting.

Figure 6:
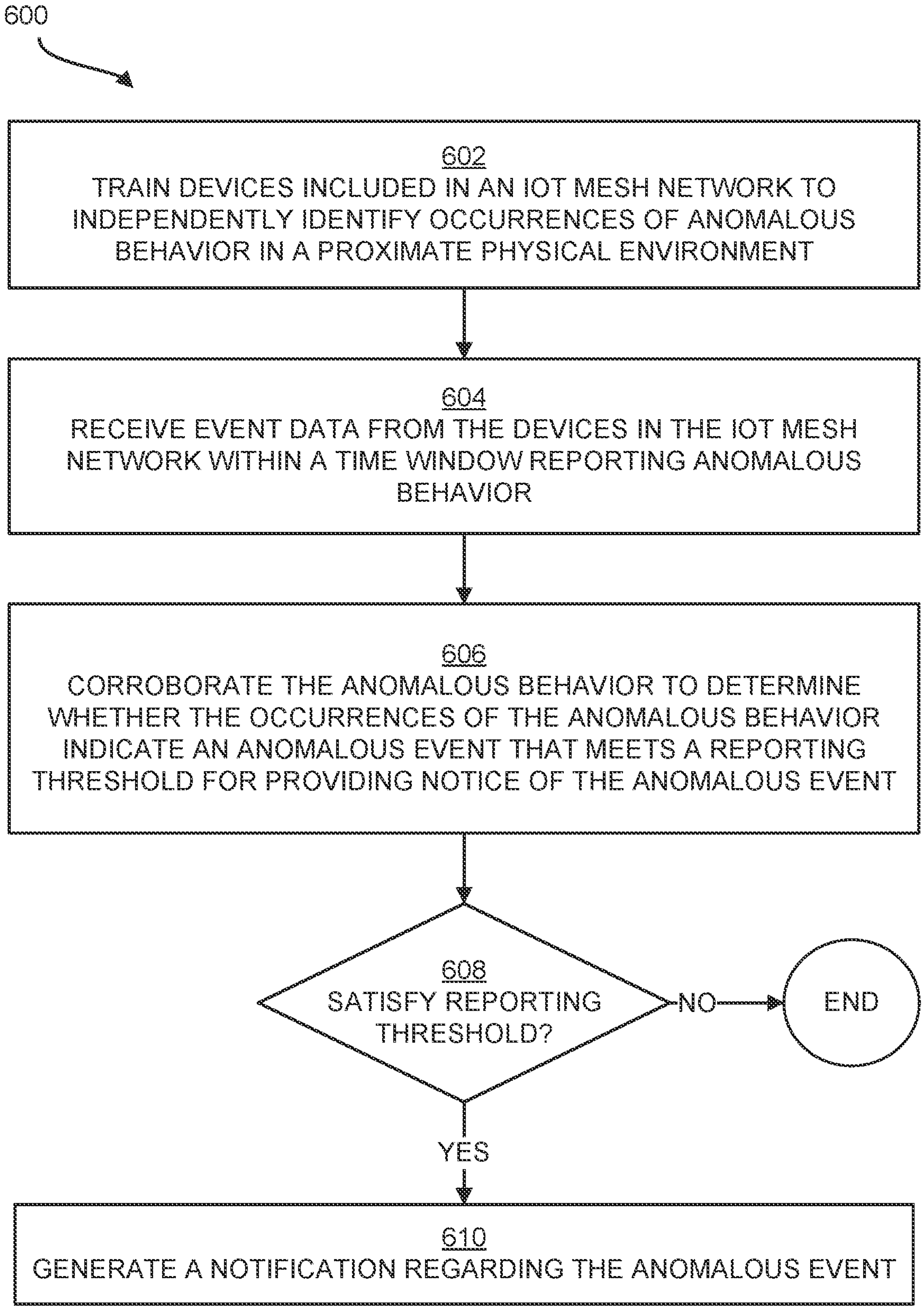
FIG. 6 is a flow diagram that illustrates an example method for corroborating anomalous behavior detected by devices in an IoT mesh network, in accordance with some embodiments of the present disclosure.

FIG. 6 is a flow diagram illustrating an example method 600 for corroborating anomalous behavior detected by devices in an IoT mesh network, in accordance with some embodiments of the present disclosure. Starting with operation 602, devices included in an IoT mesh network are trained to independently identify occurrences of anomalous behavior in a proximate physical environment. In some embodiments, a device can be trained using reinforcement learning. The reinforcement learning can comprise outputting by the device a predicted behavior and a user indicating the correctness of the predicted behavior. In this way, the personal behavior of a pet, person, and/or environment can be learned, and the device can be taught what behavior is normal and what behavior is abnormal.

Operation 604 receives event data reporting anomalous behavior from at least a portion of the devices in the IoT mesh network within a time window. A time window can be defined based on a type of anomalous behavior and/or type of anomalous event. For example, determining the occurrence of some types of anomalous events may require a larger time window to collect corroborating behavior data as compared to a time window needed to determine other types of anomalous events. Accordingly, a time window used by the method 600 can be sized to an amount of time needed to corroborate anomalous behavior reported by the devices in an IoT mesh network as being associated with an anomalous event.

Operation 606 corroborates the anomalous behavior identified by the devices to determine that the occurrences of anomalous behavior indicate an anomalous event that meets a reporting threshold for providing notice of the anomalous event. In some embodiments, determining that an anomalous event has occurred, or is imminent, does not depend on the type of anomalous behavior identified by the devices. For example, anomalous behavior identified by the devices can be of various types, such as pet behavior, human behavior, behavior associated with a natural phenomenon, etc. The method 600 can corroborate the anomalous behavior identified by the devices as being associated with an anomalous event irrespective of the type of anomalous behavior identified. Alternatively, in some embodiments, a type of anomalous behavior associated with a type of anomalous event can be correlated to another type of anomalous behavior that is also associated with the anomalous event to corroborate that the types of anomalous behavior reported by the devices indicate the occurrence, or imminent occurrence, of the anomalous event. For example, some types of pet behavior, such as anxious barking, whimpering, and cowering can precede a natural disaster, such as an earthquake. The method 600 can correlate instances of these types of anomalous behaviors identified by devices located throughout a region covered by an IoT mesh network to corroborate that the anomalous behaviors indicate an imminent natural disaster.

In some embodiments, determining that anomalous behavior reported by the devices is associated with an anomalous event includes determining that an intensity and frequency of the anomalous behavior meets the reporting threshold for providing a notification of the anomalous event. The intensity of anomalous behavior refers to a scale or degree of the behavior, such as the modulation and/or inflection of the behavior (e.g., loudness or cadence of barking, running, yelling, etc.). The frequency of anomalous behavior refers to a number of reports of the anomalous behavior received from individual devices within a time window (e.g., reports received from at least three devices within a one-minute time window), and/or a frequency of reports received from a single device (e.g., five reports from a single device within a one-minute time window). Accordingly, a reporting threshold for an anomalous event can be based on an intensity and frequency of anomalous behavior. For example, the method 600 analyzes each report of anomalous behavior received during a time window to determine whether the intensity of the anomalous behavior (e.g., cadence of barking, running, yelling, etc.) meets an intensity level; and the method 600 sums the reports that meet the intensity level to determine whether the number of devices (e.g., greater than four devices), and/or the number of reports from a device (e.g., greater than five reports), satisfies a reporting frequency requirement.

Operation 608 determines whether the reporting threshold has been satisfied (e.g., intensity and frequency as described above), and operation 610 generates a notification regarding the anomalous event. The notification can be sent to user-devices that are associated with users of the IoT mesh network. In some embodiments, the notification can be sent to user-devices which are subscribed to receive notifications regarding anomalous events detected within the boundaries of the IoT mesh network. In other embodiments, the notification can be used to sound an alarm or siren to warn individuals.

In some embodiments, after determining that the reporting threshold has been satisfied, but prior to generating a notification, the method 600 determines whether the anomalous behavior may have been provoked by an external event, such as a calendar event, moderate weather event, traffic event, or another type of event that may provoke abnormal behavior in animals, people, or in an environment, but generally does not warrant generating a notification. Accordingly, the method 600 analyzes external event data (e.g., calendar data, weather data, traffic data, etc.) to determine whether an external event may have provoked instances of the anomalous behavior, and in the case that an external event corresponding to the anomalous behavior is identified, the method 600 does not generate a notification.

The method 600 described above can be performed by a computer (e.g., computer 701 in FIG. 7), performed in a cloud environment (e.g., clouds 706 or 705 in FIG. 7), and/or generally can be implemented in fixed-functionality hardware, configurable logic, logic instructions, etc., or any combination thereof. Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 700 contains an example of an environment for the execution of at least some of the computer code involved in performing the inventive methods, such as an anomalous event service, shown in block 750, that corroborates anomalous behavior detected by IoT devices trained to identify instances of anomalous behavior in a respective proximate physical environment. In addition to block 750, computing environment 700 includes, for example, computer 701, wide area network (WAN) 702, end user device (EUD) 703, remote server 704, public cloud 705, and private cloud 706. In this embodiment, computer 701 includes processor set 710 (including processing circuitry 720 and cache 721), communication fabric 711, volatile memory 712, persistent storage 713 (including operating system 722 and block 750, as identified above), peripheral device set 714 (including user interface (UI), device set 723, storage 724, and Internet of Things (IoT) sensor set 725), and network module 715. Remote server 704 includes remote database 730. Public cloud 705 includes gateway 740, cloud orchestration module 741, host physical machine set 742, virtual machine set 743, and container set 744.

COMPUTER 701 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 730. As is well understood in the art of computer technology, and depending upon the technology, performance of a computer-implemented method may be distributed among multiple computers and/or between multiple locations. On the other hand, in this presentation of computing environment 700, detailed discussion is focused on a single computer, specifically computer 701, to keep the presentation as simple as possible. Computer 701 may be located in a cloud, even though it is not shown in a cloud in FIG. 7. On the other hand, computer 701 is not required to be in a cloud except to any extent as may be affirmatively indicated.

PROCESSOR SET 710 includes one, or more, computer processors of any type now known or to be developed in the future. Processing circuitry 720 may be distributed over multiple packages, for example, multiple, coordinated integrated circuit chips. Processing circuitry 720 may implement multiple processor threads and/or multiple processor cores. Cache 721 is memory that is located in the processor chip package(s) and is typically used for data or code that should be available for rapid access by the threads or cores running on processor set 710. Cache memories are typically organized into multiple levels depending upon relative proximity to the processing circuitry. Alternatively, some, or all, of the cache for the processor set may be located "off chip." In some computing environments, processor set 710 may be designed for working with qubits and performing quantum computing.

Computer readable program instructions are typically loaded onto computer 701 to cause a series of operational steps to be performed by processor set 710 of computer 701 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 721 and the other storage media discussed below. The computer readable program instructions, and associated data, are accessed by processor set 710 to control and direct performance of the inventive methods. In computing environment 700, at least some of the instructions for performing the inventive methods may be stored in block 750 in persistent storage 713.

COMMUNICATION FABRIC 711 is the signal conduction paths that allow the various components of computer 701 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 712 is any type of volatile memory now known or to be developed in the future. Examples include dynamic type random access memory (RAM) or static type RAM. Typically, the volatile memory is characterized by random access, but this is not required unless affirmatively indicated. In computer 701, the volatile memory 712 is located in a single package and is internal to computer 701, but, alternatively or additionally, the volatile memory may be distributed over multiple packages and/or located externally with respect to computer 701.

PERSISTENT STORAGE 713 is any form of non-volatile storage for computers that is now known or to be developed in the future. The non-volatility of this storage means that the stored data is maintained regardless of whether power is being supplied to computer 701 and/or directly to persistent storage 713. Persistent storage 713 may be a read only memory (ROM), but typically at least a portion of the persistent storage allows writing of data, deletion of data and re-writing of data. Some familiar forms of persistent storage include magnetic disks and solid-state storage devices. Operating system 722 may take several forms, such as various known proprietary operating systems or open-source Portable Operating System Interface type operating systems that employ a kernel. The code included in block 750 typically includes at least some of the computer code involved in performing the inventive methods.

PERIPHERAL DEVICE SET 714 includes the set of peripheral devices of computer 701. Data communication connections between the peripheral devices and the other components of computer 701 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 723 may include components such as a display screen, speaker, microphone, wearable devices (such as goggles and smart watches), keyboard, mouse, printer, touchpad, game controllers, and haptic devices. Storage 724 is external storage, such as an external hard drive, or insertable storage, such as an SD card. Storage 724 may be persistent and/or volatile. In some embodiments, storage 724 may take the form of a quantum computing storage device for storing data in the form of qubits. In embodiments where computer 701 is required to have a large amount of storage (for example, where computer 701 locally stores and manages a large database) then this storage may be provided by peripheral storage devices designed for storing very large amounts of data, such as a storage area network (SAN) that is shared by multiple, geographically distributed computers. IoT sensor set 725 is made up of sensors that can be used in Internet of Things applications. For example, one sensor may be a thermometer and another sensor may be a motion detector.

NETWORK MODULE 715 is the collection of computer software, hardware, and firmware that allows computer 701 to communicate with other computers through WAN 702. Network module 715 may include hardware, such as modems or WI-FI signal transceivers, software for packetizing and/or de-packetizing data for communication network transmission, and/or web browser software for communicating data over the internet. In some embodiments, network control functions and network forwarding functions of network module 715 are performed on the same physical hardware device. In other embodiments (for example, embodiments that utilize software-defined networking (SDN)), the control functions and the forwarding functions of network module 715 are performed on physically separate devices, such that the control functions manage several different network hardware devices. Computer readable program instructions for performing the inventive methods can typically be downloaded to computer 701 from an external computer or external storage device through a network adapter card or network interface included in network module 715.

WAN 702 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a WI-FI network. The WAN and/or LANs typically include computer hardware such as copper transmission cables, optical transmission fibers, wireless transmission, routers, firewalls, switches, gateway computers and edge servers.

END USER DEVICE (EUD) 703 is any computer system that is used and controlled by an end user (for example, a customer of an enterprise that operates computer 701), and may take any of the forms discussed above in connection with computer 701. EUD 703 typically receives helpful and useful data from the operations of computer 701. For example, in a hypothetical case where computer 701 is designed to provide a recommendation to an end user, this recommendation would typically be communicated from network module 715 of computer 701 through WAN 702 to EUD 703. In this way, EUD 703 can display, or otherwise present, the recommendation to an end user. In some embodiments, EUD 703 may be a client device, such as thin client, heavy client, mainframe computer, desktop computer and so on.

REMOTE SERVER 704 is any computer system that serves at least some data and/or functionality to computer 701. Remote server 704 may be controlled and used by the same entity that operates computer 701. Remote server 704 represents the machine(s) that collect and store helpful and useful data for use by other computers, such as computer 701. For example, in a hypothetical case where computer 701 is designed and programmed to provide a recommendation based on historical data, then this historical data may be provided to computer 701 from remote database 730 of remote server 704.

PUBLIC CLOUD 705 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 705 is performed by the computer hardware and/or software of cloud orchestration module 741. The computing resources provided by public cloud 705 are typically implemented by virtual computing environments that run on various computers making up the computers of host physical machine set 742, which is the universe of physical computers in and/or available to public cloud 705. The virtual computing environments (VCEs) typically take the form of virtual machines from virtual machine set 743 and/or containers from container set 744. It is understood that these VCEs may be stored as images and may be transferred among and between the various physical machine hosts, either as images or after instantiation of the VCE. Cloud orchestration module 741 manages the transfer and storage of images, deploys new instantiations of VCEs and manages active instantiations of VCE deployments. Gateway 740 is the collection of computer software, hardware, and firmware that allows public cloud 705 to communicate through WAN 702.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 706 is similar to public cloud 705, except that the computing resources are only available for use by a single enterprise. While private cloud 706 is depicted as being in communication with WAN 702, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 705 and private cloud 706 are both part of a larger hybrid cloud.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

Any advantages discussed in the present disclosure are example advantages, and embodiments of the present disclosure can exist that realize all, some, or none of any of the discussed advantages while remaining within the spirit and scope of the present disclosure.

What is claimed is:

1. A computer-implemented method comprising:

training a first behavior classifier hosted on a first device included in an Internet of Things (IOT) mesh network to independently identify occurrences of anomalous behavior in a first human environment proximate to the first device, the anomalous behavior resulting from one or more non-computer network events occurring within the first human environment;

training a second behavior classifier hosted on a second device included in the IoT mesh network to independently identify occurrences of anomalous behavior in a second human environment proximate to the second device, the anomalous behavior resulting from one or more non-computer network events occurring within the second human environment;

receiving event data from the first and second devices corresponding to a time window, wherein the event data reports occurrences of at least one type of anomalous behavior in the first and second human environments;

corroborating the at least one type of anomalous behavior to determine that the occurrences of the at least one type of anomalous behavior indicate an anomalous event that meets a reporting threshold for providing notice of the anomalous event; and generating a notification regarding the anomalous event.

2. The computer-implemented method of claim 1, wherein corroborating the at least one type of anomalous behavior further comprises:

correlating a first type of anomalous behavior and a second type of anomalous behavior reported in the event data to the anomalous event.

3. The computer-implemented method of claim 1, wherein corroborating the at least one type of anomalous behavior further comprises:

determining that an intensity and frequency of the at least one type of anomalous behavior meets the reporting threshold for providing the notification of the anomalous event.

4. The computer-implemented method of claim 1, further comprising:

analyzing external event data to determine whether an external event provoked the occurrences of the at least one type of anomalous behavior; and determining an absence of an external event that could have provoked the at least one type of anomalous behavior.

5. The computer-implemented method of claim 1, further comprising:

sending the notification to one or more user-devices associated with users of the IoT mesh network.

6. The computer-implemented method of claim 1, further comprising sending the notification to one or more user-devices subscribed to receive notifications regarding the anomalous event, wherein the one or more user-devices are not associated with users of the IoT mesh network.

7. The computer-implemented method of claim 1, wherein training the first and second devices further comprises training the first and second devices using reinforcement learning.

8. A system comprising:

one or more computer readable storage media storing program instructions and one or more processors which, in response to executing the program instructions, are configured to:

receive event data from at least a portion of devices in an Internet of Things (IOT) mesh network corresponding to a time window, wherein the devices include a behavior classifier, and the devices are independently trained to identify occurrences of anomalous behavior in a human environment where the devices are situated, where the anomalous behavior results from one or more non-computer network events occurring within the human environment where the devices are situated, and wherein the event data reports occurrences of at least one type of anomalous behavior identified by the devices;

corroborate the at least one type of anomalous behavior to determine that the occurrences of the at least one type of anomalous behavior indicate an anomalous event;

determine that a number of the devices in the IoT mesh network reporting the at least one type of anomalous behavior during the time window meets a reporting threshold for providing notice of the anomalous event; and generate a notification regarding the anomalous event.

9. The system of claim 8, wherein the program instructions configured to cause the one or more processors to corroborate the at least one type of anomalous behavior are further configured to cause the one or more processors to:

correlate a first type of anomalous behavior and a second type of anomalous behavior reported in the event data to the anomalous event.

10. The system of claim 8, wherein the program instructions configured to cause the one or more processors to determine that the number of the devices reporting the at least one type of anomalous behavior during the time window meets the reporting threshold are further configured to cause the one or more processors to:

determine that an intensity of the at least one type of anomalous behavior meets the reporting threshold for providing the notification of the anomalous event.

11. The system of claim 8, wherein the program instructions are further configured to cause the one or more processors to:

analyze external event data to determine whether an external event provoked the occurrences of the at least one type of anomalous behavior; and determine an absence of an external event that could have provoked the at least one type of anomalous behavior.

12. The system of claim 8, wherein the program instructions are further configured to cause the one or more processors to send the notification to one or more user-devices associated with users of the IoT mesh network.

13. The system of claim 8, wherein the program instructions are further configured to cause the one or more processors to send the notification to one or more user-devices subscribed to receive notifications regarding the anomalous event, wherein the one or more user-devices are not associated with users of the IoT mesh network.

14. The system of claim 8, wherein the devices are trained to identify the at least one type of anomalous behavior using reinforcement learning, and the training of the devices is performed within the human environment where the devices are situated.

15. A computer program product comprising:

one or more computer readable storage media, and program instructions collectively stored on the one or more computer readable storage media, the program instructions configured to cause one or more processors to:

receive event data from at least a portion of devices in an Internet of Things (IOT) mesh network corresponding to a time window, wherein the devices include a behavior classifier, and the devices are independently trained to identify occurrences of anomalous behavior in a human environment where the devices are situated, where the anomalous behavior results from one or more non-computer network events occurring within the human environment where the devices are situated, and wherein the event data reports occurrences of at least one type of anomalous behavior identified by the devices;

corroborate the at least one type of anomalous behavior to determine that the occurrences of the at least one type of anomalous behavior indicate an anomalous event that meets a reporting threshold for providing notice of the anomalous event; and generate a notification regarding the anomalous event.

16. The computer program product of claim 15, wherein the program instructions configured to cause the one or more processors to corroborate the at least one type of anomalous behavior are further configured to cause the one or more processors to:

correlate a first type of anomalous behavior and a second type of anomalous behavior reported in the event data to the anomalous event.

17. The computer program product of claim 15, wherein the program instructions configured to cause the one or more processors to corroborate the at least one type of anomalous behavior are further configured to cause the one or more processors to:

determine that an intensity and frequency of the at least one type of anomalous behavior meets the reporting threshold for providing the notification of the anomalous event.

18. The computer program product of claim 15, wherein the program instructions are further configured to cause the one or more processors to:

analyze external event data to determine whether an external event provoked the occurrences of the at least one type of anomalous behavior; and determine an absence of an external event that could have provoked the at least one type of anomalous behavior.

19. The computer program product of claim 15, wherein the program instructions are further configured to cause the one or more processors to send the notification to one or more user-devices subscribed to receive notifications regarding the anomalous event.

20. The computer program product of claim 15, wherein the devices are trained to identify the at least one type of anomalous behavior using reinforcement learning, and the training of the devices is performed within the human environment where the devices are situated.

* * * * *